US012597794B2

(12) United States Patent
Tang et al.

(10) Patent No.: US 12,597,794 B2
(45) Date of Patent: Apr. 7, 2026

(54) BATTERY CHARGING METHOD, ELECTRONIC APPARATUS, STORAGE MEDIUM, AND PROGRAM PRODUCT

(71) Applicant: Huawei Technologies Co., Ltd., Shenzhen (CN)

(72) Inventors: Ruichao Tang, Shenzhen (CN); Xingdi Huang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 600 days.

(21) Appl. No.: 18/000,077

(22) PCT Filed: Apr. 27, 2021

(86) PCT No.: PCT/CN2021/090081
§ 371 (c)(1),
(2) Date: Nov. 28, 2022

(87) PCT Pub. No.: WO2021/238547
PCT Pub. Date: Dec. 2, 2021

(65) Prior Publication Data
US 2023/0216324 A1 Jul. 6, 2023

(30) Foreign Application Priority Data
May 29, 2020 (CN) .......................... 202010472662.4

(51) Int. Cl.
*H02J 7/00* (2006.01)
(52) U.S. Cl.
CPC ................................ *H02J 7/00712* (2020.01)

(58) Field of Classification Search
CPC .................................................... H02J 7/00712
See application file for complete search history.

(56) References Cited

U.S. PATENT DOCUMENTS

| | | | | |
|---|---|---|---|---|
| 2012/0229078 | A1* | 9/2012 | Mack ................... | H01M 10/482 |
| | | | | 320/107 |
| 2014/0370940 | A1* | 12/2014 | Yoshida ................ | H02J 7/0048 |
| | | | | 315/161 |
| 2015/0008885 | A1* | 1/2015 | Yoshida ................ | H02J 7/0016 |
| | | | | 320/136 |

FOREIGN PATENT DOCUMENTS

| | | |
|---|---|---|
| CN | 101488591 A | 7/2009 |
| CN | 101795010 A | 8/2010 |
| CN | 103094944 A | 5/2013 |
| CN | 107994650 A | 5/2018 |

* cited by examiner

*Primary Examiner* — Daniel Kessie
(74) *Attorney, Agent, or Firm* — Slater Matsil, LLP

(57) ABSTRACT

A method includes: obtaining a current charging current and voltages of n electrochemical cells; if a difference between a highest voltage in the voltages of the n electrochemical cells and a preset upper limit of a single electrochemical cell charging voltage is less than or equal to a preset difference, determining a derating current, where the preset difference is greater than or equal to 0, the highest voltage is less than or equal to the upper limit of the single electrochemical cell charging voltage, and the derating current is less than the current charging current; and indicating to charge the battery with the derating current.

17 Claims, 7 Drawing Sheets

Voltage of an
electrochemical cell m
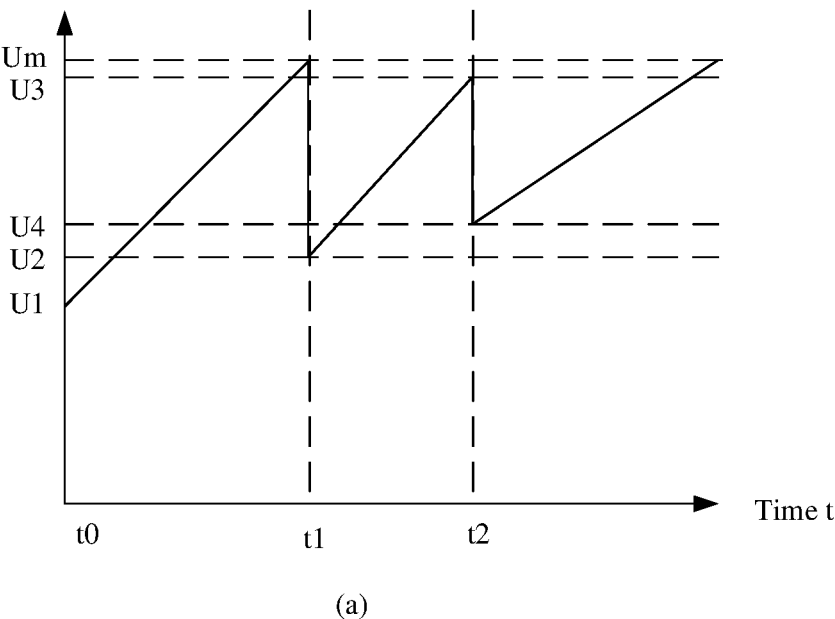
(a)
Charging current
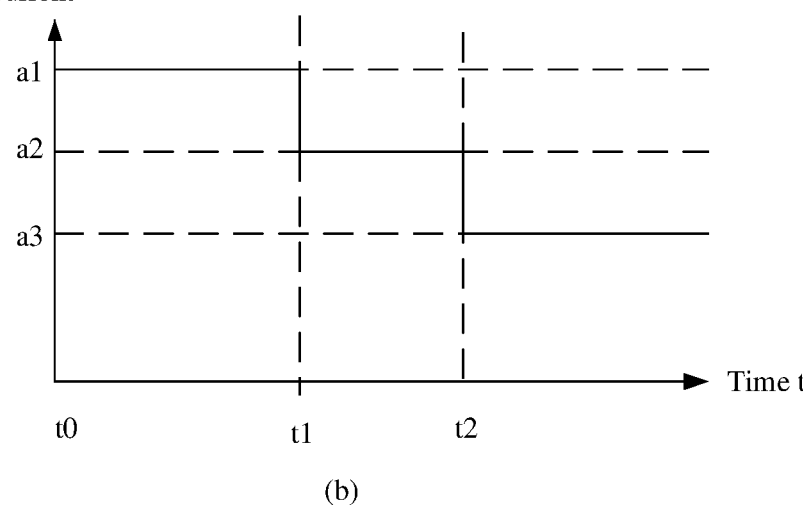
(b)
FIG. 3

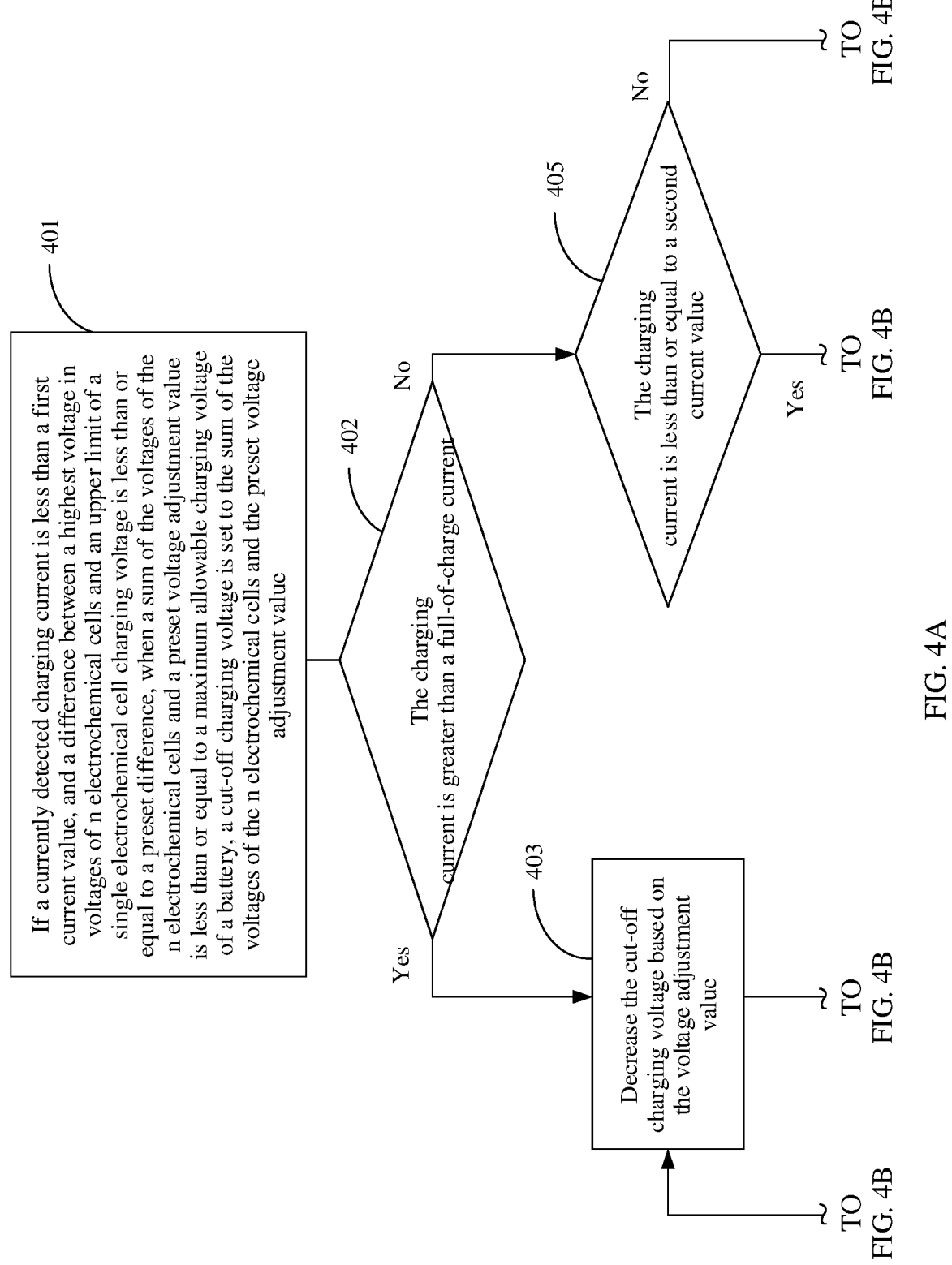

401

If a currently detected charging current is less than a first current value, and a difference between a highest voltage in voltages of n electrochemical cells and an upper limit of a single electrochemical cell charging voltage is less than or equal to a preset difference, when a sum of the voltages of the n electrochemical cells and a preset voltage adjustment value is less than or equal to a maximum allowable charging voltage of a battery, a cut-off charging voltage is set to the sum of the voltages of the n electrochemical cells and the preset voltage adjustment value

402

The charging current is greater than a full-of-charge current

Yes

No

403

Decrease the cut-off charging voltage based on the voltage adjustment value

405

The charging current is less than or equal to a second current value

No

Yes

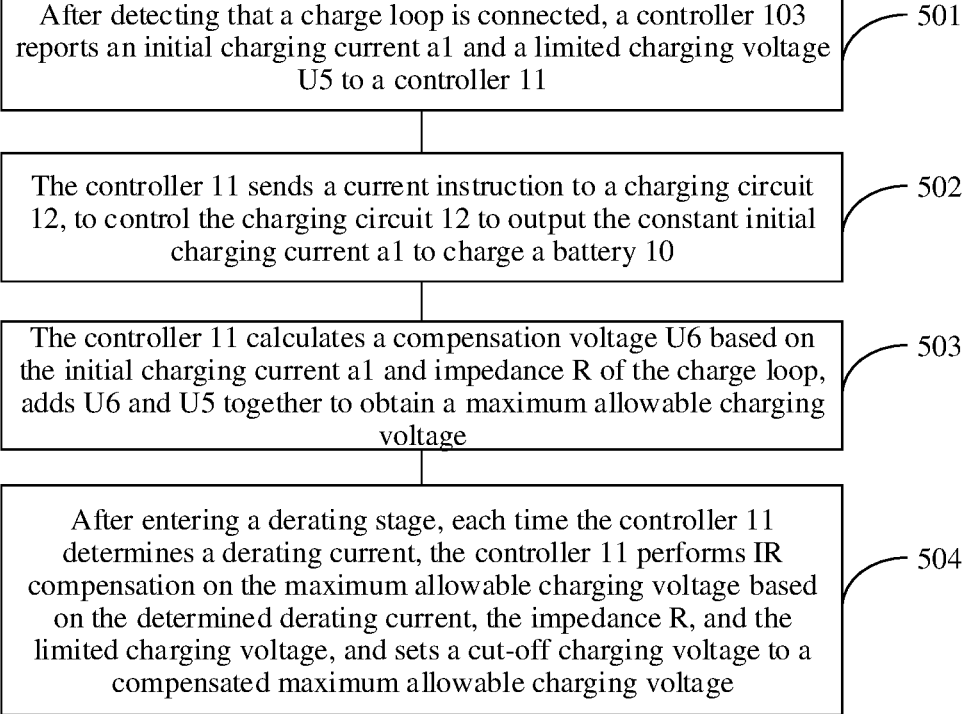

After detecting that a charge loop is connected, a controller 103 reports an initial charging current a1 and a limited charging voltage U5 to a controller 11 — 501

The controller 11 sends a current instruction to a charging circuit 12, to control the charging circuit 12 to output the constant initial charging current a1 to charge a battery 10 — 502

The controller 11 calculates a compensation voltage U6 based on the initial charging current a1 and impedance R of the charge loop, adds U6 and U5 together to obtain a maximum allowable charging voltage — 503

After entering a derating stage, each time the controller 11 determines a derating current, the controller 11 performs IR compensation on the maximum allowable charging voltage based on the determined derating current, the impedance R, and the limited charging voltage, and sets a cut-off charging voltage to a compensated maximum allowable charging voltage — 504

FIG. 5

Electronic device

Charging management module

FIG. 7

BATTERY CHARGING METHOD, ELECTRONIC APPARATUS, STORAGE MEDIUM, AND PROGRAM PRODUCT

CROSS-REFERENCE TO RELATED APPLICATIONS

This application is a National Stage of International Application No. PCT/CN2021/090081, filed on Apr. 27, 2021, which claims priority to Chinese Patent Application No. 202010472662.4 filed on May 29, 2020. Both of the aforementioned applications are hereby incorporated by reference in their entireties.

TECHNICAL FIELD

This application pertains to the field of terminal technologies, and in particular, to a battery charging method, an electronic apparatus, a storage medium, and a program product.

BACKGROUND

To improve charging efficiency, a battery (for example, a lithium-ion battery) in an electronic device is usually charged in a constant current (Constant Current, CC)-constant voltage (Constant Voltage, CV) charging manner. That is, after the electronic device is connected to a charger, the charger generally first outputs, based on control of the electronic device, a relatively large charging current to charge the battery, so that a charging voltage of the battery rapidly rises. This stage is referred to as a constant-current charging stage. When the charging voltage output by the charger rises to a limited charging voltage of the battery, the charger maintains outputting the limited charging voltage, and enters a constant voltage charging stage, so that the charging current gradually decreases with time until the battery is fully charged.

The battery in the electronic device mostly uses a battery structure in which a plurality of electrochemical cells are connected in series. The limited charging voltage is generally a sum of rated voltages of the plurality of electrochemical cells. However, physical characteristics (for example, a charging initial voltage, an internal resistance, and a capacity) of electrochemical cells of a same specification may be different. As a result, a problem of uneven voltage division occurs to the plurality of electrochemical cells in a charging process. Therefore, in the charging process, voltages of some electrochemical cells may reach the rated voltages of the electrochemical cells in advance while the charging voltage does not reach the limited charging voltage. And the voltages of these electrochemical cells continue to increase. Consequently, these electrochemical cells are overcharged and may suffer from problems such as swelling and performance degradation.

SUMMARY

Embodiments of this application provide a battery charging method, an electronic apparatus, a storage medium, and a program product, to resolve a problem that some electrochemical cell is overcharged due to uneven voltage division of electrochemical cells in a charging process of a battery formed by a plurality of electrochemical cells connected in series.

According to a first aspect, this application provides a battery charging method, applied to a battery formed by n electrochemical cells, where n is an integer greater than 1, and the method includes: obtaining a current charging current and voltages of the n electrochemical cells; if a difference between a highest voltage in the voltages of the n electrochemical cells and a preset upper limit of a single electrochemical cell charging voltage is less than or equal to a preset difference, determining a derating current, where the preset difference is greater than or equal to 0, the highest voltage is less than or equal to the upper limit of the single electrochemical cell charging voltage, and the derating current is less than the current charging current; and indicating to charge the battery with the derating current.

According to the method provided in this application, each time it is detected that the highest voltage in the voltages of the n electrochemical cells reaches or is about to reach the upper limit of the single electrochemical cell charging voltage, the charging current is derated, so that the voltages of the n electrochemical cells decrease, thereby ensuring that in a constant current charging stage, the voltage of each electrochemical cell does not exceed the upper limit of the single electrochemical cell charging voltage, to prevent the electrochemical cell from being overcharged.

Optionally, the determining a derating current includes: determining a corresponding derating current based on an interval in which the current charging current located.

Optionally, the determining a derating current includes: determining the derating current from a preset current sequence.

Based on the optional manner, the derating current is determined from the preset current sequence by using a table lookup method, so that the charging current is derated based on an optimized fixed current value, thereby simplifying a derating algorithm and improving charging efficiency.

Optionally, after the determining a derating current, the method further includes: calculating a compensation voltage based on the derating current and impedance of a charge loop of the battery; adding a limited charging voltage of the battery and the compensation voltage to obtain a maximum allowable charging voltage of the battery; and setting a cut-off charging voltage to the maximum allowable charging voltage.

Based on the optional manner, in the constant current charging stage, IR compensation and update are performed on the maximum allowable charging voltage based on the derating current, and the cut-off charging voltage of a charging circuit is refreshed based on an updated maximum allowable charging voltage. This can prevent, to some extent, the charging voltage output by the charging circuit from reaching the maximum allowable charging voltage in advance before the voltage of the battery reaches the limited charging voltage. Therefore, the charging circuit is prevented from switching from a constant current charging mode to a constant voltage charging mode in advance, to ensure charging efficiency of the battery.

Optionally, if the current charging current is less than a first current value, and the difference between the highest voltage and the upper limit of the single electrochemical cell charging voltage is less than or equal to the preset difference, the method further includes: if a sum of the voltages of the n electrochemical cells and a preset voltage adjustment value is less than or equal to the maximum allowable charging voltage of the battery, setting the sum of the voltages of the n electrochemical cells and the preset voltage adjustment value to the cut-off charging voltage.

Optionally, after the setting the sum of the voltages of the n electrochemical cells and the preset voltage adjustment value to the cut-off charging voltage, the method further includes: if it is detected that the charging current is greater than a full-of-charge current of the battery, decreasing the cut-off charging voltage based on the voltage adjustment value.

Optionally, after the setting the sum of the voltages of the n electrochemical cells and the preset voltage adjustment value to the cut-off charging voltage, the method further includes: if it is detected that the charging current is less than or equal to a preset second current value, when a sum of the cut-off charging voltage and the voltage adjustment value is less than or equal to the maximum allowable charging voltage, increasing the charging cutoff voltage based on the voltage adjustment value, where the second current value is less than a full-of-charge current of the battery.

Based on the foregoing three optional manners, after the charging current decreases to the first current value, the cut-off charging voltage of the charging circuit is refreshed, so that a charging mode of the charging circuit is switched from the constant current charging mode to the constant voltage charging mode, thereby adjusting the charging current and accelerating full charging-detection. When it is ensured that a full charging condition can be detected, it can be ensured that the voltages of the n electrochemical cells always do not exceed the upper limit of the single electrochemical cell charging voltage.

According to a second aspect, this application provides an electronic apparatus. The electronic apparatus may be an electronic device, a power management module in the electronic device, a charging management module in the electronic device, or a charging management chip in the charging management module.

When the electronic apparatus is the charging management chip, the charging management chip includes a processor. The processor is coupled to a memory, and the processor executes a computer program or instructions stored in the memory, to implement the battery charging method according to any one of the first aspect or the optional manners of the first aspect. The memory may be disposed in the charging management chip, or may be located in another chip.

Optionally, when the electronic apparatus is the charging management module, the charging management module includes a charging management chip, a battery formed by n electrochemical cells, and a charging circuit. A processor in the charging management chip is connected to the battery and the charging circuit. The processor is coupled to a memory. The processor executes a computer program or instructions stored in the memory, to implement the battery charging method according to any one of the first aspect or the optional manners of the first aspect.

Optionally, when the electronic apparatus is the electronic device, the electronic device includes a charging management module, and the charging management module includes a charging management chip, a battery formed by n electrochemical cells, and a charging circuit. A processor in the charging management chip is connected to the battery and the charging circuit. The processor is coupled to a memory. The processor executes a computer program or instructions stored in the memory, to implement the battery charging method according to any one of the first aspect or the optional manners of the first aspect.

According to a third aspect, this application provides a nonvolatile computer-readable storage medium. The computer-readable storage medium stores a computer program, and when the computer program is executed by a processor, the battery charging method according to any one of the first aspect or the optional manners of the first aspect is implemented.

According to a fourth aspect, an embodiment of this application provides a computer program product. When the computer program product runs on an electronic device, the electronic device performs the battery charging method according to any one the first aspect or the optional manners of the first aspect.

For technical effects of the second aspect to the fourth aspect provided in this application, refer to the technical effects of the first aspect or the optional manners of the first aspect. Details are not described herein again.

BRIEF DESCRIPTION OF THE DRAWINGS

FIG. 3 is a schematic diagram of a charging scenario according to this application;

FIG. 4A and FIG. 4B are a flowchart 2 of an embodiment of a battery charging method according to this application;

FIG. 5 is a flowchart 3 of an embodiment of a battery charging method according to this application;

FIG. 7 is a schematic diagram of a structure of an electronic device according to this application.

DETAILED DESCRIPTION OF ILLUSTRATIVE EMBODIMENTS

Figure 1:
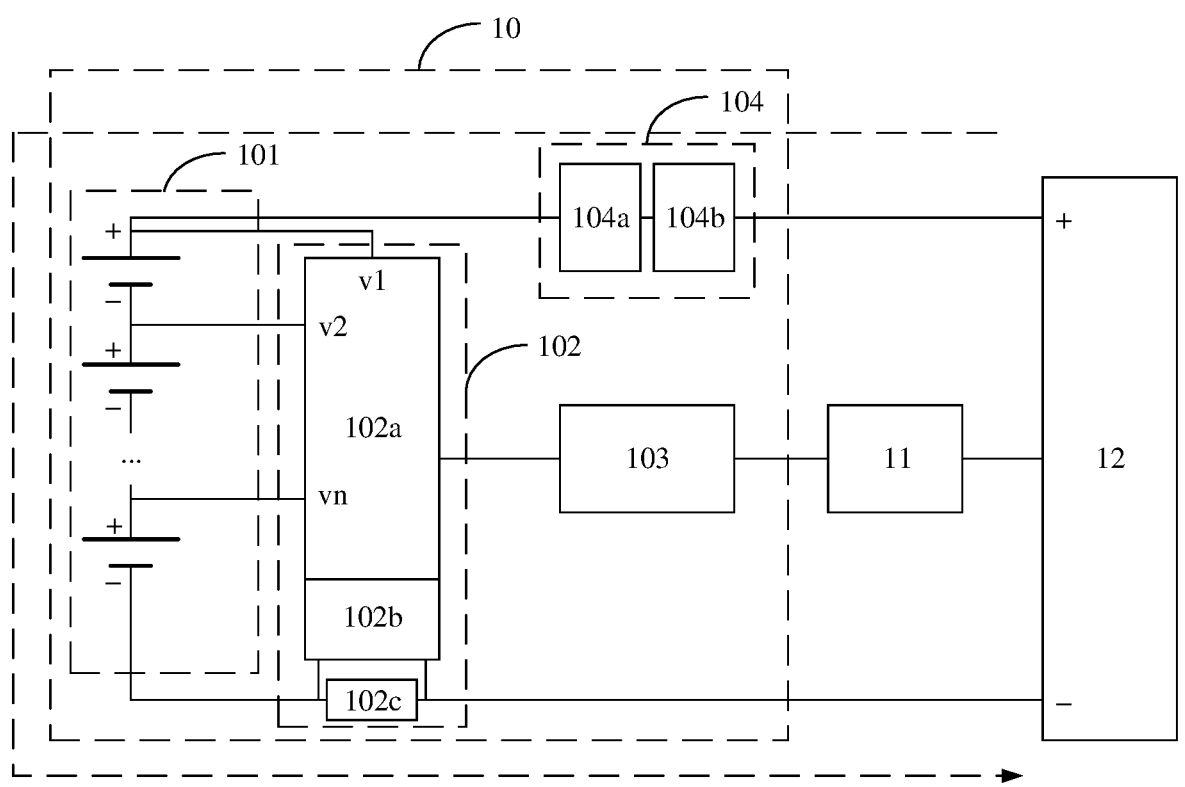
FIG. 1 is a schematic diagram of a structure of a charging management module according to this application.

The following provides an example description of a charging method provided in this application with reference to specific embodiments. Some terms are involved in the descriptions. For example, the ordinal numbers such as a term "first" or "second" should be understood as merely distinguishing, unless the ordinal numbers definitely indicate a sequence according to the context. A term "example" or "for example" is used to represent giving an example, an illustration, or a description. Any embodiment or design solution described as "example" or "for example" in embodiments of this application should not be interpreted as being more preferable or more advantageous than another implementation or design solution. Exactly, use of the word "example", "for example", or the like is intended to present a relative concept in a specific manner.

Unless otherwise stated, in this specification, "/" usually represents that associated objects before and after "/" are in an "or" relationship. For example, A/B may represent A or B. A term "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more.

The battery charging method provided in this application is applicable to an electronic device powered by a rechargeable battery, for example, a notebook computer, a tablet computer, or a smartphone. To help a reader understand the battery charging method provided in this application, an example description of a charging management module in the electronic device is provided with reference to FIG. 1. Refer to a structure example of the charging management module shown in FIG. 1. The charging management module may generally include a battery 10, a controller 11, and a charging circuit 12. The battery 10 includes n (n>1, where n is an integer) electrochemical cells 101 connected in series, a sampling circuit 102, a controller 103, and a protection circuit 104.

The sampling circuit 102 includes a voltage sampling analog-to-digital converter (Analog-to-Digital Converter, ADC) 102a, a current sampling ADC 102b, and a current sampling resistor 102c. The voltage sampling ADC 102a is an ADC configured to sample a voltage of each electrochemical cell, and includes n voltage sampling ports, that is, v1, v2, v3, . . . , and vn shown in FIG. 1. The n voltage sampling ports are respectively connected to positive electrodes of the n electrochemical cells, to collect the voltage of each electrochemical cell.

The current sampling ADC 102b is connected to both ends of the current sampling resistor 102c, and is configured to collect a current on the current sampling resistor 102c. Because the current sampling resistor 102c is connected in series to a charge loop (a loop shown by a dashed arrow in FIG. 1), the current on the current sampling resistor 102c is equal to a current of the battery 10, and is also equal to a charging current output by the charging circuit 12.

It should be noted that a charging current or a charging current of the battery 10 mentioned below indicates the charging current output by the charging circuit 12. The current of the battery 10 indicates a current flowing through the battery 10. In a charging process, the current of the battery 10 is usually equal to the charging current output by the charging circuit 12.

A charging voltage or a charging voltage of the battery 10 mentioned below indicates a charging voltage output by the charging circuit 12. The voltage of the battery 10 is a sum of voltages of the n electrochemical cells. Because impedance may exist on the charge loop, the voltage of the battery 10 is usually less than or equal to the charging voltage output by the charging circuit 12.

In addition, although not shown, a temperature detection module (for example, a temperature sensor) and the like may further be included in the sampling circuit 102, and are configured to collect a temperature of the battery 10 in the charging process.

The controller 103 may be a unit that can implement logic control, such as one or more single-chip microcomputers or a central processing unit (central processing unit, CPU). The protection circuit 104 includes a charge switch 104a and a discharge switch 104b. The controller 103 is connected to the sampling circuit 102 and the protection circuit 104. The controller 103 may determine, based on information, such as a voltage, a current, and a temperature, collected by the sampling circuit 102, whether the battery 10 is in an abnormal charging/discharging state (for example, high-temperature charging, an abnormal voltage, or an abnormal current), and control connection/disconnection of the charge switch 104a and the discharge switch 104b, to implement charging/discharging protection for the battery 10. In addition, the controller 103 may further perform full charging detection based on the information, such as the voltage, the current, and the temperature, collected by the circuit 102, to determine whether the battery 10 is fully charged.

The controller 11 may be a unit that can implement logic control, such as one or more single-chip microcomputers or a CPU. The controller 11, the control 103, and the charging circuit 12 are connected through a communications bus or directly connected. The controller 11 may send a current instruction or a voltage instruction to the charging circuit 12 based on a voltage and a current that are reported by the controller 103, to control the charging circuit 12 to output a specified charging current or charging voltage to perform charging control. In embodiments of this application, the current instruction is an instruction used to set the current output by the charging circuit 12. The voltage instruction is an instruction used to set a cut-off charging voltage of the charging circuit 12.

In addition, the controller 11 may further predetermine an abnormal charging state based on information reported by the controller 103. When it is determined that the battery 10 is about to enter the abnormal charging state, the charging circuit 12 is controlled to stop output, to implement charging protection. For example, an abnormal charging state of high-temperature charging is used as an example. When a temperature of the battery 10 reaches a temperature threshold 1 in the charging process, it indicates that the battery 10 enters the high-temperature charging state. The temperature threshold 1 is set in the controller 103. When the controller 10 determines that a temperature value read from the sampling circuit 102 reaches the temperature threshold 1, the controller 103 may determine that the battery 10 is in the high-temperature charging state. Then, the controller 103 controls the charge switch 104a to be disconnected, so that the battery 10 stops receiving input from a charger, to implement protection for the battery 10. When the controller 103 determines that the temperature value read from the sampling circuit 102 does not reach the temperature threshold 1, charging protection does not need to be performed, and the controller 103 reports the temperature value to the controller 11. A temperature threshold 2 is set in the controller 11, and the temperature threshold 2 is less than the temperature threshold 1. When the controller 11 determines that the received temperature value reaches the temperature threshold 2, the controller 11 may determine that the temperature of the battery 10 is about to rise to the temperature threshold 2, that is, the battery 10 is about to enter the high-temperature charging state. Therefore, the controller 11 may send an instruction to the charging circuit 12 to control the charging circuit 12 to stop output, to implement protection for the battery 10 in advance.

It should be noted that the charging management module may include the controller 103 and the controller 11, or include one of the controller 103 and the controller 11. When the charging management module includes one of the controller 103 and the controller 11, the controller is directly connected to the sampling circuit 102, the protection circuit 104, and the charging circuit 12, to collect information (a voltage, a current, a temperature, and the like), and control and protect charging/discharging.

The charging circuit 12 may be a circuit component that is integrated in the electronic device and that is configured to connect to the charger. For example, the charging circuit 12 may include a universal serial bus (Universal Serial Bus, USB) interface configured to be connected to the charger. The USB interface is an interface that conforms to a USB standard specification, and may specifically be a mini USB interface, a micro USB interface, a USB type-C interface, or the like. When the charging circuit 12 is connected to the charger, the charger may output the charging voltage and the charging current to the battery 10 by using the charging circuit 12, to charge each electrochemical cell in the battery 10.

Based on the charging management module shown in FIG. 1, when the charging circuit 12 is connected to the charger, the controller 103 controls the charge switch 104a to connect the charging loop. The controller 103 reports a limited charging voltage and a rated charging current (that is, a maximum charging current allowed by the battery 10) of the battery 10 to the controller 11. The controller 11 sends the current instruction to the charging circuit 12, to indicate the charging circuit 12 to output the charging current based on the rated charging current of the battery 10. It may be understood that, if the charger connected to the charging circuit 12 supports outputting the rated charging current, the charging circuit 12 outputs the rated charging current to perform constant current charging on the battery 10. If the charger connected to the charging circuit 12 does not support outputting the rated charging current, and a maximum current that can be output by the charger is less than the rated charging current, the charging circuit 12 outputs the maximum current that can be output by the charger, to perform constant current charging on the battery 10.

In a constant current charging process, the charging current of the battery 10 remains unchanged, and the charging voltage gradually increases with time. Correspondingly, the voltage of the battery 10 (that is, a total voltage of the n electrochemical cells) also increases with time. The controller 103 periodically obtains the voltages, temperatures, and currents that are of the n electrochemical cells and that are collected by the sampling circuit 102, and determines whether a case like an excessively high temperature, an abnormal voltage, or an abnormal current occurs to the battery 10, to determine whether power-off protection needs to be performed (that is, turn off the charge switch 104a).

Generally, in the charging process, to avoid overcharging, the voltage of the battery 10 cannot exceed the limited charging voltage of the battery 10. Therefore, the controller 11 usually uses the limited charging voltage of the battery 10 as the maximum allowable charging voltage that can be output by the charging circuit 12, and sets the cut-off charging voltage of the charging circuit 12 to the maximum allowable charging voltage by using the voltage instruction. In this way, when the charging voltage increases to the maximum allowable charging voltage with time, the maximum allowable charging voltage maintains being output to the charging circuit 12, and constant voltage charging is performed on the battery 10, to ensure that the voltage of the battery 10 does not exceed the limited charging voltage of the battery 10, thereby implementing charging protection. In a constant voltage charging process, the charging voltage of the battery 10 remains unchanged, and the charging current decreases with time until the battery is fully charged.

However, physical characteristics (for example, a charging start voltage, an internal resistance, and a capacity) of the n electrochemical cells of the battery 10 may not be completely consistent. As a result, a problem of uneven voltage division occurs to the n electrochemical cells in the charging process. The limited charging voltage of the battery 10 is generally a sum of rated voltages of the n electrochemical cells. Before the charging voltage reaches the maximum allowable charging voltage, the voltage of some of the n electrochemical cells may have exceeded the rated voltage of the electrochemical cell.

For example, if n=4, and the rated voltage of the electrochemical cell is 4.39 V, the limited charging voltage of the battery 10 is 4*4.39=17.56 V. In the constant current charging stage, due to uneven voltage division, the voltage of one electrochemical cell increases to 4.5 V, and the voltage of the remaining three electrochemical cells increases to 4 V. In this case, the charging voltage rises to 4.5+4+4+4=16.5 V, which is less than 17.56 V, and the charging circuit 12 does not maintain the charging voltage of 16.5 V to enter a constant voltage charging mode. Therefore, the electrochemical cell whose voltage exceeds the rated voltage is overcharged. This further causes problems such as swelling and performance degradation of the electrochemical cell.

To resolve a problem that some electrochemical cell is overcharged due to uneven voltage division of the electrochemical cells in the charging process of the battery formed by a plurality of electrochemical cells connected in series, this application provides a battery charging method, and the charging current in the constant current charging process is controlled in a stepped derating manner, to limit a voltage rise of the electrochemical cell. That is, each time it is detected that a highest voltage in the voltages of the n electrochemical cells reaches or is about to reach an upper limit of a single electrochemical cell charging voltage, the charging current is derated, so that the voltages of the n electrochemical cells decrease, thereby ensuring that in the constant current charging stage, the voltage of each electrochemical cell does not exceed the upper limit of the single electrochemical cell charging voltage, to prevent the electrochemical cell from being overcharged.

The following provides an example description of the battery charging method provided in this application with reference to specific embodiments.

Figure 2:
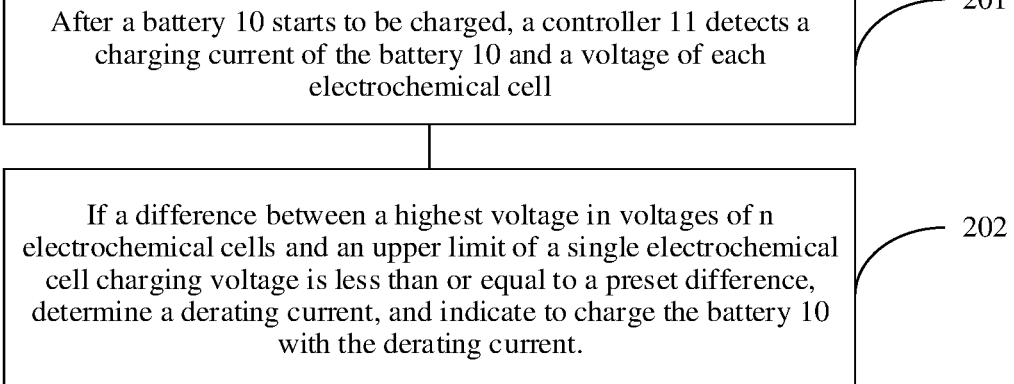
FIG. 2 is a flowchart 1 of an embodiment of a battery charging method according to this application.

FIG. 2 is a flowchart of an embodiment of a battery charging method according to this application. The following method steps may be performed by an electronic device. For example, based on the charging management module in the electronic device shown in FIG. 1, the following method steps may be specifically controlled and implemented by the controller 103 or the controller 11 in the electronic device. Based on the charging management module shown in FIG. 1, the following describes a procedure of this embodiment by using the controller 11 in the electronic device as an example. As shown in FIG. 2, the method includes the following steps.

S201: After the battery 10 starts to be charged, the controller 11 detects a charging current of the battery 10 and a voltage of each electrochemical cell.

After the battery 10 starts to be charged, the controller 103 periodically reads charging information of the battery 10 from the sampling circuit 102. The charging information includes a charging current and voltages of the n electrochemical cells, and may further include a temperature and the like. The controller 103 first detects, based on the charging information, whether the battery 10 is fully charged, whether a temperature of the battery 10 is excessively high, whether a charging exception exists, and the like, to determine whether charging needs to be ended. When determining that charging needs to be continued, the controller 103 reports the collected charging information to the controller 11, and the controller 11 continues to detect the charging information, to determine whether the controller 11 needs to perform charging protection. If the controller 11 determines that charging is continued, the controller 11 determines whether the obtained charging information meets a preset derating condition.

In this embodiment of this application, the derating condition may be that a difference between a highest voltage in the voltages of the n electrochemical cells and an upper limit of a single electrochemical cell charging voltage is less than or equal to a preset difference.

The upper limit of the single electrochemical cell charging voltage may be a rated voltage of the electrochemical cell. For example, a rated voltage of an electrochemical cell commonly used in a notebook computer is usually 4.35 V or 4.4 V. Alternatively, the upper limit of the single electrochemical cell charging voltage may also be set according to an actual requirement. For example, the upper limit of the single electrochemical cell charging voltage may be set to a voltage value less than the rated voltage of the electrochemical cell. This is not limited in this application.

The preset difference is a value greater than or equal to 0, and is used to control a degree to which the highest voltage approaches the upper limit of the single electrochemical cell charging voltage. For example, if the preset difference is set to 0, it indicates that, when the highest voltage reaches the upper limit of the single electrochemical cell charging voltage, the charging current needs to be derated, so that the voltages of the n electrochemical cells are decreased, thereby preventing the voltage of any electrochemical cell from rising above the upper limit of the single electrochemical cell charging voltage.

If the preset difference is set to be greater than 0, it indicates that, when the difference between the highest voltage and the upper limit of the single electrochemical cell charging voltage is less than or equal to the preset difference, the highest voltage is about to reach the upper limit of the single electrochemical cell charging voltage. In this case, the charging current may also be derated, to reduce the voltage of each electrochemical cell in advance, and prevent the voltage of any electrochemical cell from rising above the upper limit of the single electrochemical cell charging voltage.

Optionally, the derating condition may further include that the charging current is greater than a preset first current value. That is, when the charging current is greater than the first current value, the charging current may be derated until the charging current decreases to the first current value.

The first current value may be a current value that is in current values that can be output by the charging circuit 12 based on a setting of a current instruction and that has a minimum difference from a full-of-charge current of the battery 10. The full-of-charge current of the battery 10 indicates a current value that can trigger a full-charging condition. For example, the full-charging condition is that the charging current is less than the full-of-charge current and lasts for preset duration. When the charging current meets the full-charging condition, it indicates that charging of the battery 10 has been completed. The full-of-charge current of the battery 10 is generally obtained through testing based on a physical characteristic of the battery 10.

For example, the full-of-charge current of the battery 10 is 100 mA (mA). It is assumed that, based on current setting precision, current values that have minimum differences from 100 mA in the current values that can be output by the charging circuit 12 based on the current instruction are 80 mA and 120 mA, and 80 mA is less than 120 mA. Therefore, the first current value may be set to 80 mA. Alternatively, it is assumed that, based on the current setting precision, an output current of the charging circuit 12 may be set to 100 mA, which is equal to the full-of-charge current of the battery 10. In this case, the first current value may also be set to 100 mA. Alternatively, based on the current setting precision, a minimum output current of the charging circuit 12 may be set to 120 mA. In this case, the first current value may be set to 120 mA.

In actual application, the first current value may be set based on the full-of-charge current of the battery 10 and the current setting precision of the charging circuit 12. This is not limited in this application.

S202: If the difference between the highest voltage in the voltages of the n electrochemical cells and the upper limit of the single electrochemical cell charging voltage is less than or equal to the preset difference, the controller 11 determines a derating current, and indicates to charge the battery 10 with the derating current.

For example, as shown in (a) in FIG. 3, it is assumed that charging of the battery 10 starts from a moment to, and an initial value of the charging current is a1. The initial value may be a rated charging current of the battery 10 (that is, a maximum charging current allowed by the battery 10). The rated charging current may be preset in the controller 103 of the battery 10. When the battery 10 starts to be charged, the controller 103 may report the rated charging current to the controller 11, and the controller 11 sends a current instruction to the charging circuit 12, to control the charging circuit 12 to output the rated charging current and perform constant current charging on the battery 10. Certainly, the initial value may also be a current value that is set to be less than the rated charging current according to an actual situation. For example, the controller 103 or the controller 11 may determine a proportion (for example, 80%) based on currently measured information such as a voltage and a temperature of the battery 10, and then use a product of the proportion and the rated charging current as the initial value. This is not limited in this application.

Refer to (b) in FIG. 3. After the battery 10 starts to be charged, the voltages are generated on the n electrochemical cells. It is assumed that, at the moment to, a voltage of an electrochemical cell m in the n electrochemical cells is maximum, and the voltage of the electrochemical cell m is U1. As charging time is prolonged, battery power in the battery 10 increases, and the voltage of each electrochemical cell also gradually increases. However, the voltage of the electrochemical cell m is always the highest voltage in the voltages of the n electrochemical cells. At a moment t1, the controller 11 detects that the voltage of the electrochemical cell m reaches the upper limit (for example, indicated by Um) of the single electrochemical cell charging voltage. That is, because a difference between the highest voltage and Um is 0, which is less than the preset difference, the controller 11 determines that the currently detected voltages of the n electrochemical cells meet the derating condition, and needs to perform derating on a current charging current a1.

The controller 11 determines a derating current a2 (a2<a1), and decreases the charging current from a1 to a2. For example, after determining a2, the controller 11 sends the current instruction to the charging circuit 12, to indicate the charging circuit 12 to output a2 to charge the battery 10.

It may be understood that, when the charging current decreases, the voltage of each electrochemical cell also decreases. As shown in FIG. 3, at the moment t1, after the charging current decreases from a1 to a2, the voltage of the electrochemical cell m decreases from Um to U2, and a difference (that is, Um-U2) between Um and U2 is greater than the preset difference. After the moment t1, the charging circuit 12 continues to perform constant current charging on the battery 10 by using a2 as the charging current. After the voltages of the n electrochemical cells decrease, the voltages of the n electrochemical cells increase again with the charging time. Until a moment t2, the controller 11 detects that the voltage of the cell m is used as the highest voltage in the voltages of the n cells and increases to U3. Because Um-U3 is less than the preset difference, the controller 11 determines that the voltages of the n electrochemical cells detected at the moment t2 meet the derating condition again, and needs to perform derating on the current charging current again.

The controller 11 determines that the derating current is a3, and sends the current instruction to the charging circuit 12, to indicate the charging circuit 12 to output a3 to perform constant current charging on the battery 10. That is, when the highest voltage in the voltages of the n electrochemical cells is about to reach Um, the controller 11 performs derating on the charging current again, so that the voltage of each electrochemical cell decreases again. A highest voltage after the decrease is U4, and U4 is less than Um. Therefore, the voltage of each electrochemical cell does not exceed Um.

It may be understood that, after the moment t2, because the controller 11 has derated the charging current to the first current value a3, the controller 11 may stop performing derating on the charging current based on the derating condition.

It can be learned from FIG. 3 that, in the battery charging method provided in this application, a constant current charging manner of stepped derating is used. Each time it is detected that the highest voltage in the voltages of the n electrochemical cells reaches or is about to reach the upper limit of the single electrochemical cell charging voltage, the charging current is derated, so that the voltages of the n electrochemical cells decrease, thereby ensuring that the voltage of any electrochemical cell exceeds the upper limit of the single electrochemical cell charging voltage. In this way, during constant current charging of the battery 10, an overcharge problem of any electrochemical cell is avoided, to ensure battery safety.

It should be noted that each time the controller 11 detects that the derating condition is met, the controller 11 may choose to delay for a period of time (for example, 2 seconds) before performing a derating operation. Alternatively, when it is detected that the derating condition is met for a plurality of consecutive times, the derating operation is performed. Therefore, it can be avoided that the derating condition is met because the voltages of the n electrochemical cells jitter, and the charging time is prevented from being improperly prolonged due to incorrect derating. When the voltages of the n electrochemical cells and the charging current meet the derating condition, the derating operation is performed.

In addition, it should be further noted that, in a charging process of the battery 10, a voltage of a same electrochemical cell or a plurality of electrochemical cells (the voltages of the plurality of electrochemical cells are the same) may always be maximum. Alternatively, in different charging stages, because an internal resistance of each electrochemical cell is affected by a temperature change, a highest voltage is voltages of different electrochemical cells.

The following provides an example description of a process in which the controller 11 determines the derating current with reference to two examples.

Example 1: The derating current may be a current value preconfigured in the controller 11, or may be a current value calculated by the controller 11 according to a preset derating rule.

For example, the derating rule preconfigured in the controller 11 includes a plurality of current intervals and a derating step or a derating current corresponding to each current interval. It is assumed that a derating step adjustment threshold (indicated by c1), an adjustment step (indicated by c2), the first current value a3, and two derating steps (respectively indicated by b1 and b2) are configured in the controller 11, $b1 \geq b2$, $c1-b1 > a3$, and $c2 > b2$. b1 and b2 may be determined based on the setting precision of the charging circuit 12. For example, b1 may be a minimum current setting step of the charging circuit 12, and b2 may be a positive integer multiple of b1. It is assumed that a magnitude of the current charging current is d, and the current charging current and the voltages of the n electrochemical cells meet the derating condition. In this case, the derating rule may be shown in Table 1.

TABLE 1

| Current interval | Derating current |
|---|---|
| $(c1, +\infty)$ | $d - b1$ |
| $(a3 + c2, a1]$ | $d - b2$ |
| $(a3, a3 + c2]$ | $a3$ |

It can be learned based on Table 1 that, if $d > c1$, the derating current determined by the controller n1 is $d-b1$, and the charging current is reduced from d to d-b1.

If $a3+a2 \leq d < c1$, the derating current determined by the controller n1 is $d-b2$, and the charging current is reduced from d to d-b2.

If $a3 \leq d < a3+c2$, the derating current determined by the controller n1 is a3, and the charging current is reduced from d to a3. After the controller 11 reduces the charging current to a3, the controller 11 may stop performing derating on the charging current based on the derating condition.

It should be noted that, in Example 1, an actual current value measured by the sampling circuit 102 may be different from the charging current output by the charging circuit 12 due to jitter. For example, the charging current output by the charging circuit 12 is 3.58 A, and a current value received by the controller 11 from the controller 103 is 3.581 A. However, the charging circuit 12 may not be able to set a step of 1 mA according to the current instruction. Therefore, the controller 11 may determine, based on the current setting precision of the charging circuit 12, a theoretical current value corresponding to the actual current value. For example, if the current setting precision of the charging circuit 12 is 10 mA, when the received actual current value is 3.581 A, it may be determined that the corresponding theoretical current value is 3.58 A. That is, in this case, the charging current obtained by the controller 11 is 3.58 A.

Example 2: The derating rule may include a plurality of current intervals and a current sequence corresponding to each current interval. The controller 11 may count, in a counting manner, a quantity of times that the charging current of the battery 10 and the voltages of the n electrochemical cells meet the derating condition in the charging process of the battery 10. When the voltages of the n electrochemical cells meet the derating condition for the first time, the current sequence corresponding to the interval in which the charging current is located is determined, that is, the current sequence corresponding to the interval in which the initial value of the charging current is located is determined. Then, it is determined that the first current value in the current sequence is a current derating current. Correspondingly, when the voltages of the n electrochemical cells meet the derating condition for the $M^{th}$ time, it is determined that the $M^{th}$ current value in the current sequence is a current derating current. It may be understood that current values in each current sequence decrease one by one according to an arrangement sequence, and a minimum current value is the first current value.

For example, in this example, the derating rule may be shown in Table 2.

TABLE 2

| Current interval (Unit: A) | 4.5~3.86 | 3.86~3.58 | 3.58~3.32 | ... | 0.16~0.12 | 0.12~0 |
|---|---|---|---|---|---|---|
| 1 | 3.58 | 3.32 | 3.14 | ... | 0.11 | 0.1 |
| 2 | 3.32 | 3.14 | 3.01 | ... | 0.1 | |
| 3 | 3.14 | 3.01 | 2.90 | ... | | |
| 4 | 3.01 | 2.90 | 2.80 | ... | | |
| ... | ... | ... | ... | ... | | |

For example, if the initial value of the charging current is 4.5 A, an interval in which the initial value of the charging current is located is the interval (3.86, 4.5] in Table 2. When the charging current of the battery 10 and the voltages of the n electrochemical cells meet the derating condition for the first time, the controller 11 may determine that the first current value 3.58 in a current value sequence {3.58, 3.32, 3.14, 3.01, ..., 0.1} corresponding to the interval (3.86, 4.5] is a derating current of first derating, and decrease the charging current from 4.5 A to 3.58 A.

In the constant current charging process of the battery 10 at the charging current of 3.58 A, when the charging current of the battery 10 and the voltages of the n electrochemical cells meet the derating condition for the second time, the controller 11 determines that the second current value 3.32 in the current value sequence {3.58, 3.32, 3.14, 3.01, ..., 0.1} is a derating current of second derating, and decreases the charging current from 3.85 A to 3.32 A. By analogy, when the controller 11 does not detect that charging needs to be ended, until the controller 11 decreases the charging current to 0.1, the controller 11 stops perform derating on the charging current based on the derating condition.

It may be understood that, the derating condition includes that the charging current is greater than the first current value. In this case, before performing derating on the charging current, the controller 11 may alternatively first determine whether the currently detected charging current is greater than the first current value, and then perform an operation of determining a derating current.

In this embodiment of this application, after decreasing the charging current to the first current value, the controller 11 may choose to directly end charging. For example, the controller 11 indicates the charge loop 12 to disable output, to end charging. Because the first current value is close to the full-of-charge current of the battery 10, after the charging current gradually decreases to the first current value, the battery power in the battery 10 is actually almost fully charged. For example, the battery power in the battery 10 has been charged to 95%. Therefore, the controller 11 may choose to directly end charging.

Optionally, if the first current value is less than or equal to the full-of-charge current of the battery 10, when the charging current decreases to the first current value, it indicates that the charging current decreases to below the full-of-charge current, and the controller 103 may perform battery full-charging detection. For example, it is assumed that the full-charging condition is that the charging current is less than or equal to the full-of-charge current within 10 minutes. In this case, after the controller 11 decreases the charging current to the first current value, and charges the battery 10 for 10 minutes, the controller 103 may detect that the charging current of the battery meets the full-charging condition, and determine that the battery 10 is fully charged. The controller 103 sends a charging end instruction to the controller 11, and the controller 11 may control the battery 10 to end charging.

In a possible example, in a process in which the charging circuit 12 charges the battery 10 by outputting the first current value, the voltages of the n electrochemical cells still slowly increases with the charging time. Before the controller 103 detects the full-charging condition, the highest voltage in the voltages of the n electrochemical cells may increase again to a voltage, and the difference between the voltage and the upper limit of the single electrochemical cell charging voltage is less than the preset difference. To ensure that the controller 103 can detect the full-charging condition and ensure that the voltages of the n electrochemical cells always do not exceed the upper limit of the single electrochemical cell charging voltage, the controller 11 may refresh a cut-off charging voltage of the charging circuit 12 after the charging current decreases to the first current value, so that a charging mode of the charging circuit is switched from a constant current charging mode to a constant voltage charging mode, to adjust the charging current and the voltages of the n electrochemical cells.

Figure 4B:
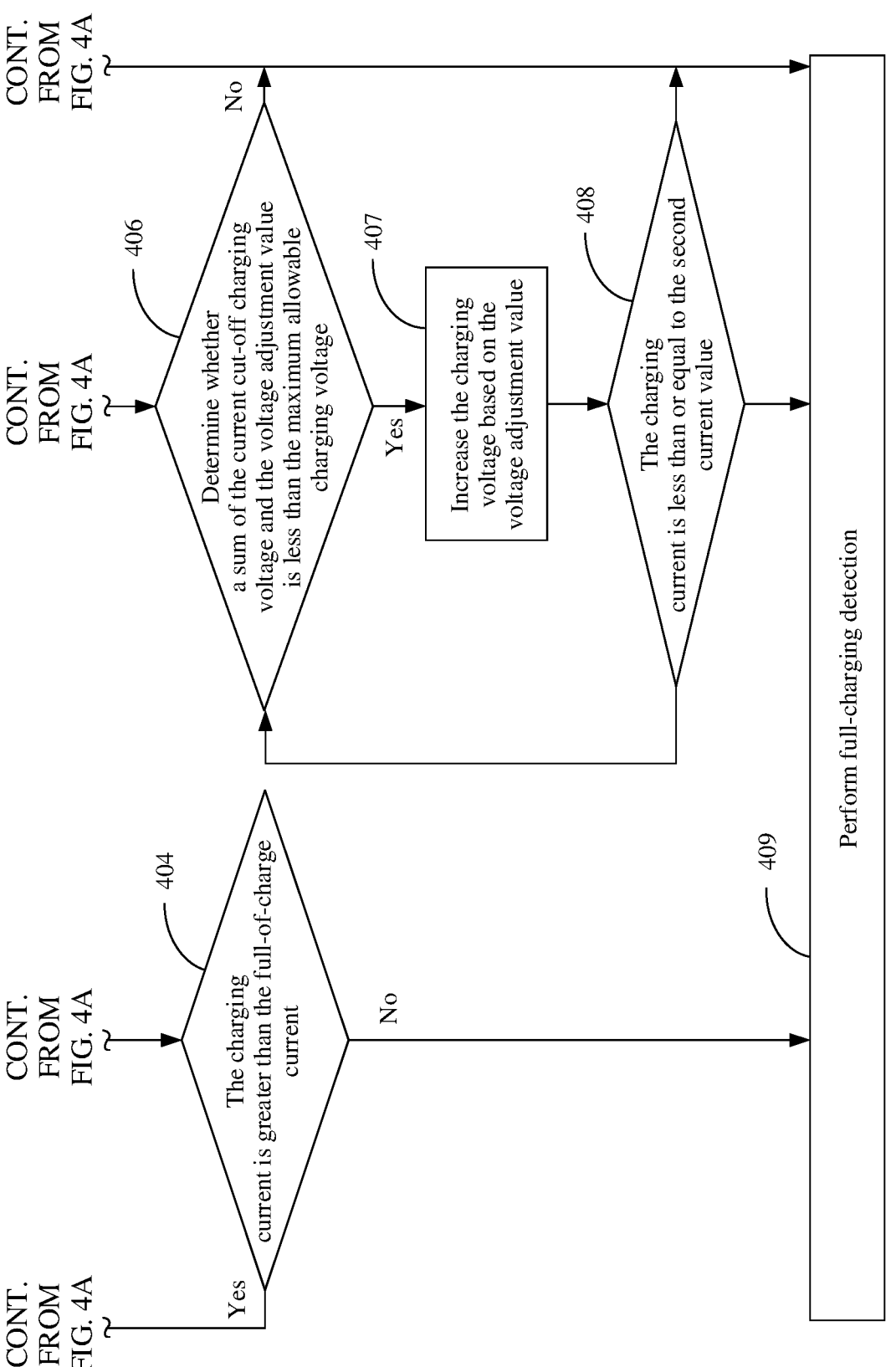

For example, FIG. 4A and FIG. 4B are a flowchart of an embodiment of a battery charging method according to this application. A process of charging the battery 10 after a charging current decreases to a first current value is mainly described. As shown in FIG. 4A and FIG. 4B, the method includes the following steps.

S401: If a currently detected charging current is less than the first current value, and a difference between a highest voltage in voltages of n electrochemical cells and an upper limit of a single electrochemical cell charging voltage is less than or equal to a preset difference, when a sum of the voltages of the n electrochemical cells and a preset voltage adjustment value is less than or equal to a maximum allowable charging voltage of the battery, the sum of the charging voltages and the preset voltage adjustment value is set to a cut-off charging voltage.

In this example, after the charging current decreases to the first current value, the controller 11 continues to perform constant current charging on the battery 10 by using the first current value, and continues to detect the voltages of the n electrochemical cells. When the highest voltage in the voltages of the n electrochemical cells reaches or is about to reach the upper limit of the charging voltage of the single electrochemical cell again, the controller 11 may adjust the charging current by setting the cut-off charging voltage, to perform full-charging detection.

For example, if the sum of the currently detected voltages of the n electrochemical cells and the preset voltage adjustment value is less than or equal to the maximum allowable charging voltage of the battery, it indicates that the current charging voltage may be increased. In this case, the controller 11 may send a voltage instruction to the charging circuit 12, to refresh a cut-off charging voltage set in the charging circuit 12, that is, the cut-off charging voltage is set to the maximum allowable charging voltage when charging starts, and is refreshed to the sum of the voltages of the n cells and the preset voltage adjustment value. When a charging voltage output by the charging circuit 12 reaches the cut-off charging voltage, the charging circuit 12 maintains outputting the cut-off charging voltage, to perform constant voltage charging on the battery 10. In this case, the charging current gradually decreases. It may be understood that, when the cut-off charging voltage decreases from the maximum allowable charging voltage to the sum of the voltages of the n electrochemical cells and the preset voltage adjustment value, the charging circuit performs constant voltage charging in advance, so that the voltage of each electrochemical cell always does not exceed the single electrochemical cell charging voltage. In addition, the charging current decreases in advance. When the controller 103 detects that the charging current gradually decreases to a full-of-charge current and meets a full-charging condition, the controller 103 may send a charging end instruction to the controller 11, so that the controller 11 indicates the charging circuit 12 to disable output, to end charging. Therefore, detection of the full-charging condition is accelerated.

The voltage adjustment value may be a minimum voltage adjustment step of the charging circuit 12, for example, 8 millivolts or 10 millivolts. A specific value may be set based on voltage setting precision of the charging circuit 12. This is not limited in this application.

Certainly, if the sum of the currently detected voltages of the n electrochemical cells and the preset voltage adjustment value is greater than the maximum allowable charging voltage of the battery, it indicates that the current charging voltage cannot be increased, and the controller 11 may not perform a related action. The cut-off charging voltage of the charging circuit 12 is still the maximum allowable charging voltage. In this case, the charging voltage of the charging circuit 12 is about to reach the cut-off charging voltage, and maintains outputting the cut-off charging voltage. Therefore, it can ensure that a single electrochemical cell voltage is not charged.

Optionally, to ensure that the controller 103 can quickly identify the full-charging condition, in a process of performing constant voltage charging on the battery 10, the controller 11 may control a magnitude of the charging current by adjusting a magnitude of the cut-off charging voltage of the charging circuit 12. For example, when the charging current is greater than the full-of-charge current, the cut-off charging voltage is decreased based on the voltage adjustment value until the charging current is less than or equal to the full-of-charge current. Alternatively, when the charging current is far less than the full-of-charge current, for example, less than a preset second current value (the second current value is less than the full-of-charge current, for example, the full-of-charge current is 100 mA, and the second current value is 50 mA), the cut-off charging voltage is increased based on the voltage adjustment value, until the charging current is greater than or equal to the second current value, or until the cut-off charging voltage increases to the maximum allowable charging voltage. In this manner, the full-charging condition is that the charging current is less than or equal to the full-of-charge current and greater than the second current value within preset duration.

For example, after step S401, the battery charging method may further include the following steps S402 to 207.

S402: The controller 11 detects whether the charging current is greater than the full-of-charge current. If yes, step S403 is performed; otherwise, step S405 is performed.

S403: The controller 11 decreases the cut-off charging voltage based on the voltage adjustment value.

That is, the controller 11 decreases a voltage adjustment value based on the current charging voltage, and then sends the voltage instruction to the charging circuit 12, to refresh the cut-off charging voltage of the charging circuit 12. In this case, the charging circuit 12 outputs a decreased cut-off charging voltage, to perform constant voltage charging on the battery 10. After the cut-off charging voltage decreases, the charging current decreases accordingly. Then, the controller 11 may continue to perform S404.

S404: The controller 11 detects whether the charging current is greater than the full-of-charge current. If yes, step S403 is performed. Alternatively, if no (that is, the charging current is less than or equal to the full-of-charge current), step 409 is performed.

S405: The controller 11 detects whether the charging current is less than or equal to the second current value. If yes, step S406 is performed. Alternatively, if no (that is, the charging current is greater than the full-of-charge current), step 409 is performed.

S406: Determine whether a sum of the current cut-off charging voltage and the voltage adjustment value is less than the maximum allowable charging voltage. If yes, step S407 is performed. Alternatively, if no (that is, the sum of the current charging voltage and the voltage adjustment value is greater than or equal to the maximum allowable charging voltage), step 409 is performed.

S407: The controller 11 increases the cut-off charging voltage based on the voltage adjustment value.

That is, when the sum of the current cut-off charging voltage and the voltage adjustment value is less than the maximum allowable charging voltage, it indicates that the current cut-off charging voltage may be further increased. In this case, the controller 11 adds a voltage adjustment value to the current cut-off charging voltage, and then sends the voltage instruction to the charging circuit 12, to refresh the cut-off charging voltage of the charging circuit 12. In this case, if the charging circuit 12 detects that the currently output charging voltage is less than the refreshed cut-off charging voltage, the charging circuit 12 may maintain a magnitude of the currently output charging current. Until the output charging voltage increases to the refreshed cut-off charging voltage again, the charging circuit 12 continues to maintain the refreshed cut-off charging voltage to perform constant voltage charging on the battery 10. After the cut-off charging voltage increases, the charging current increases accordingly. Then, the controller 11 may continue to perform S408.

S408: The controller 11 detects whether the charging current is less than or equal to the second current value. If yes, step S406 is performed. Alternatively, if no, step 409 is performed.

In the charging process, it needs to be ensured that a voltage of the battery 10 cannot always exceed a limited charging voltage of the battery 10. Therefore, when adjusting the cut-off charging voltage, once detecting that an adjusted cut-off charging voltage is greater than the maximum allowable charging voltage, the controller 11 needs to set the cut-off charging voltage to the maximum allowable charging voltage.

S409: The controller 11 performs full-charging detection.

The full-charging detection means that the controller 103 detects whether the charging current meets the full-charging condition, that is, detects whether the charging current is less than or equal to the full-of-charge current and greater than the second current value within the preset duration. If the charging current is less than or equal to the full-of-charge current and greater than the second current value within the preset duration, it indicates that the battery 10 is fully charged. The controller 103 may send the charging end instruction to the controller 11. If the controller 11 receives the charging end instruction sent by the controller 103, the controller 11 determines that the battery 10 is fully charged, and then indicates the charging circuit 12 to disable output, to end charging.

Optionally, to ensure accuracy of full charging detection, the controller 103 may perform full charging detection for a plurality of times. For example, when the controller 103 detects, for a plurality of consecutive times, that the charging current meets the full-charging condition, the control 103 determines that the battery 10 is fully charged, and sends the charging end instruction to the controller 11, so that the controller 11 indicates the charging circuit 12 to disable output, to end charging. If it is detected, for any one time, that the charging current does not meet the full-charging condition, step 402 is returned, to start again performing detection on the charging current.

Certainly, it may be understood that, in a process of performing the foregoing steps S201 and 202 and steps S401 and 402, once the controller 103 detects that the charger is removed, high-temperature charging is performed, a current is abnormal, a voltage is abnormal, the battery 10 is faulty, or the like, the controller 103 may immediately send the controller 11 to the charging end instruction, so that the controller 11 indicates the charging circuit 12 to disable output, to end charging. In addition, after the controller 11 receives charging information reported by the controller 103, and once detects that the battery 10 is about to enter an abnormal charging state, the controller 11 may also indicate the charging circuit 12 to disable output, to end charging.

In a possible scenario, impedance usually exists on a charge loop of a charging management module, for example, including impedance of a copper wire on a printed circuit board integrated with the charging management module, impedance of a USB interface, impedance of a charger, impedance of a charging cable, and the like. When the charging current flows through the impedance, a voltage drop is generated and a part of the charging voltage is consumed. Therefore, the voltage of the battery 10 is usually less than the charging voltage output by the charging circuit 12.

For example, assuming that the impedance (that is, a sum of impedance of all parts) of the charge loop is 0.1 ohm ($\Omega$), the charging current is 2 A, and the charging voltage is 13.2 V, the voltage of the battery 10 is 13.2−0.1*2=13 V.

In this case, if the maximum allowable charging voltage of the battery 10 is still set to the limited charging voltage of the battery 10, when the voltage of the battery 10 does not reach the limited charging voltage, the charging voltage output by the charging circuit 12 already reaches the maximum allowable charging voltage. Consequently, before the voltage of the battery 10 increases to the limited charging voltage, the charging circuit 12 ends a constant current charging mode in advance, and switches to a constant voltage charging mode to charge the battery 10, to prolong charging time.

For example, it is assumed that the limited charging voltage of the battery 10 is 13.2 V. When the battery 10 starts to be charged, the control 103 reports the limited charging voltage to the controller 11. The controller 11 determines that the maximum allowable charging voltage is 13.2 V, and sets the cut-off voltage of the charging circuit 12 to 13.2 V by using the voltage instruction. When the charging voltage output by the charging circuit 12 reaches 13.2 V, because the impedance of 0.1$\Omega$ exists on the charge loop, the voltage of the battery 10 is 13 V, and does not reach the limited charging voltage. In this case, the charging voltage output by the charging circuit 12 reaches 13.2 V, and the charging circuit 12 enters the constant voltage charging mode.

To prevent the charging circuit 12 from switching the charging mode to the constant voltage charging mode in advance, an embodiment of this application provides an IR compensation solution. Each time the controller 11 sets a charging current, the controller 11 may perform IR compensation on the maximum allowable charging voltage of the battery 10 based on the set charging current, set the cut-off charging voltage of the charging circuit 12 based on a maximum allowable charging voltage obtained after IR compensation. That is, after determining a derating current each time, the controller 11 calculates a compensation voltage based on the determined derating current and the impedance of the charge loop of the battery 10, adds the limited charging voltage of the battery 10 and the compensation voltage to obtain the maximum allowable charging voltage of the battery 10, and then sets the cut-off charging voltage of the charging circuit 12 based on the maximum allowable charging voltage. In this way, before the voltage of the battery 10 reaches the limited charging voltage, a case in which the charging voltage output by the charging circuit 12 reaches the maximum allowable charging voltage in advance is avoided.

The following provides an example description of the IR compensation solution provided in this application with reference to a flowchart shown in FIG. 5.

FIG. 5 is a flowchart of another embodiment according to this application, and mainly relates to a process of performing IR compensation on a maximum allowable charging voltage in a constant current charging stage in which stepped derating is performed on a battery. As shown in FIG. 5, the method includes the following steps.

S501: After detecting that a charge loop is connected, the controller 103 reports an initial charging current a1 and a limited charging voltage U5 to the controller 11.

S502: The controller 11 sends a current instruction to the charging circuit 12, to control the charging circuit 12 to output the constant initial charging current a1 to charge the battery 10.

In this embodiment of this application, after the charging circuit 12 starts to charge the battery 10, the controller 103 in the battery 10 controls the sampling circuit 102 to periodically collect data of the battery 10, including a current of the battery 10 and a voltage of each electrochemical cell in the battery 10. A temperature of the battery 10 and the like may be further included. The controller 103 first detects, based on information such as the current of the battery 10, the voltage of each electrochemical cell, and the temperature that is detected, whether the battery 10 meets a charging end condition. The charging end condition may include occurrence of an event such as full charging of the battery 10, high-temperature charging, an abnormal current, an abnormal voltage, a fault of the battery 10, and/or removal of a charger.

If the controller 103 detects that the battery 10 does not meet the charging end condition, the controller 103 may report the collected data to the controller 11, and the controller 11 performs the following step S503 to continue the charging procedure. Otherwise, the controller 103 sends a charging end instruction to the controller 11, so that the controller 11 controls the charging circuit 12 to disable output, to end charging.

S503: The controller 11 calculates a compensation voltage U6 (that is, U6=a1*R) based on the initial charging current a1 and impedance R of the charge loop, adds U6 and U5 together to obtain the maximum allowable charging voltage, and sets a cut-off charging voltage to U6+U5.

Before entering a derating stage, the controller 11 may perform IR compensation on the maximum allowable charging voltage based on the initial charging current a1, the impedance R, and the limited charging voltage of the battery 10. After a compensated maximum allowable charging voltage is obtained, a voltage instruction is sent to the charging circuit 12, to set the cut-off charging voltage of the charging circuit 12 to the compensated maximum allowable charging voltage. In this way, entering the derating stage in advance is avoided, to ensure charging efficiency.

S504: After entering the derating stage, each time the controller 11 determines a derating current, the controller 11 performs IR compensation on the maximum allowable charging voltage based on the determined derating current, the impedance R, and the limited charging voltage, and sets the cut-off charging voltage to the compensated maximum allowable charging voltage.

Entering the derating stage means a process in which the controller 11 performs, from a time when the charging current a1 and the voltages of the n electrochemical cells meet a derating condition for the first time, derating on the charging current based on the derating condition.

For example, based on the example shown in FIG. 3, when the charging current a1 of the battery 10 and the voltages of the n electrochemical cells meet the derating condition, the derating stage is entered. The controller 11 determines the derating current a2, and decreases the charging current to the derating current a2. Then, a compensation voltage U7 (that is, U7=a2*R) is calculated based on a2 and the impedance R of the charge loop, and the maximum allowable charging voltage is obtained by adding U7 and U5. In this case, the maximum allowable charging voltage decreases from U6+U5 to U7+U5. Then, the voltage instruction is sent to the charging circuit 12, to set the cut-off charging voltage of the charging circuit 12 to U7+U5.

Similarly, in a process in which the charging circuit 12 performs constant current charging on the battery 10 by using the charging current a2 as the charging current, when the charging current a2 and the voltages of the n electrochemical cells meet the derating condition, the controller 11 determines the derating current a3, and decreases the charging current from a2 to a3. Correspondingly, the controller 11 calculates a compensation voltage U8 (U8=a3*R) based on a3 and the impedance R, and adds U8 and U5 to obtain the maximum allowable charging voltage. In this case, the maximum allowable charging voltage decreases from U7+U5 to U8+U5. Then, the voltage instruction is sent to the charging circuit 12, to set the cut-off charging voltage of the charging circuit 12 to U8+U5.

In the constant current charging stage, IR compensation and update are performed on the maximum allowable charging voltage based on the derating current, and the cut-off charging voltage of the charging circuit 12 is refreshed based on an updated maximum allowable charging voltage. This can prevent, to some extent, the charging voltage output by the charging circuit 12 from reaching the maximum allowable charging voltage in advance before the voltage of the battery 10 reaches the limited charging voltage. Therefore, the charging circuit 12 is prevented from switching from a constant current charging mode to a constant voltage charging mode in advance, to ensure charging efficiency of the battery 10.

Figure 6:
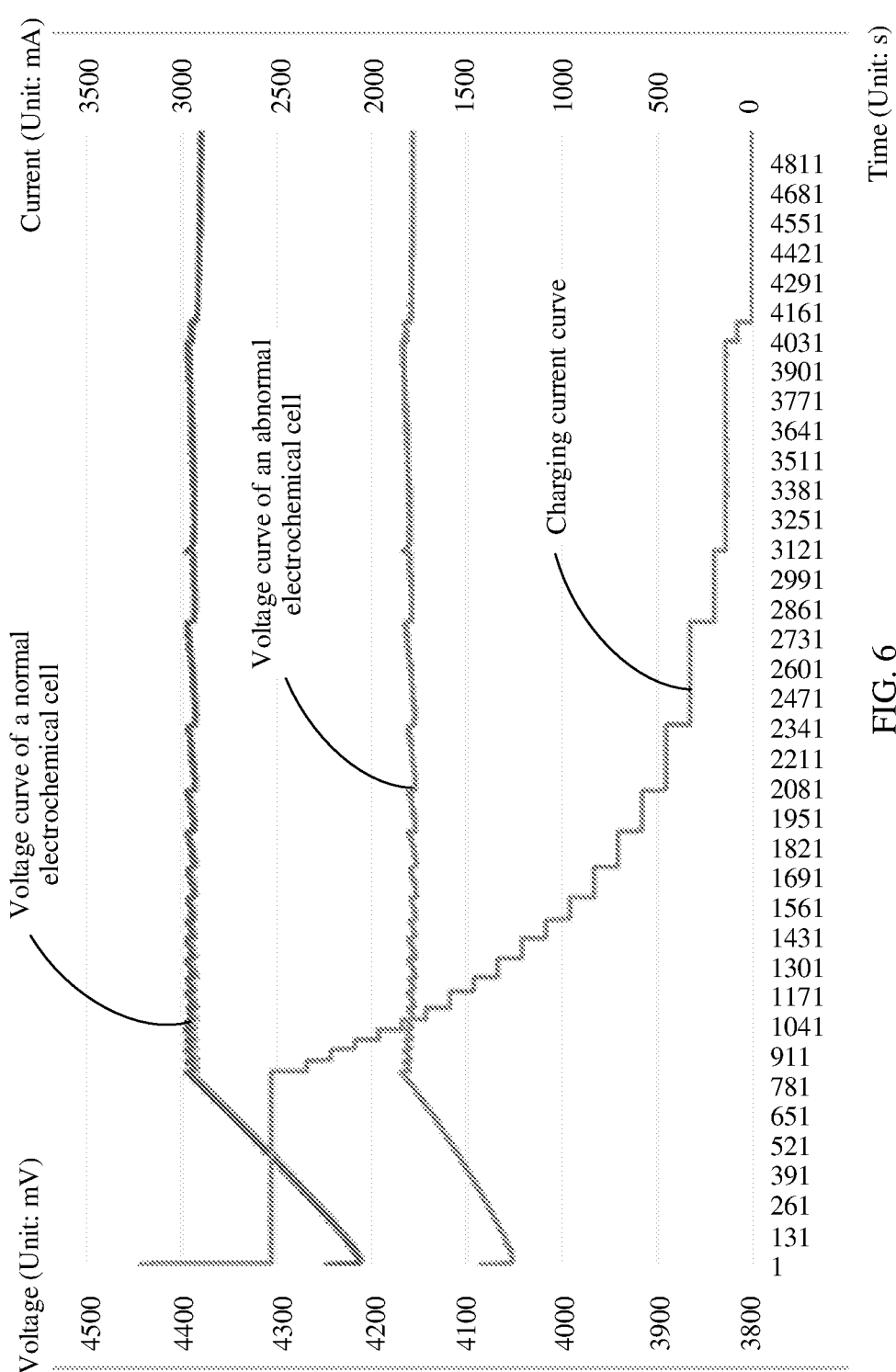
FIG. 6 is a schematic diagram of a test result of using a battery charging method provided in this application according to this application.

For example, FIG. 6 is a schematic diagram of a test result of using the battery charging method according to this application. FIG. 6 includes time-varying curves of a voltage of an electrochemical cell (including a voltage curve of a normal electrochemical cell and a voltage curve of an abnormal electrochemical cell), and a time-varying charging current curve. In a charging process, a divided voltage of the abnormal electrochemical cell is less than a divided voltage of the normal electrochemical cell. However, before the charging voltage output by the charging circuit 12 reaches the cut-off charging voltage, as charging time is prolonged, the voltage of each electrochemical cell keeps increasing. As a result, when the voltage of the normal electrochemical cell reaches the rated voltage (4400 mV), the total voltage of the battery does not exceed the limited charging voltage because the voltage of the abnormal electrochemical cell is less than the rated voltage. Therefore, the charging voltage output by the charging 12 does not reach the cut-off charging voltage. Consequently, the voltage of the normal electrochemical cell continues to increase and exceeds 4400 mV. After the battery charging method provided in this application is used, it can be learned from FIG. 6 that, starting from the 781st second, the charging current is derated once each time the voltage of the normal electrochemical cell reaches 4400 mV, so that the voltage of the normal electrochemical cell decreases to no more than 4400 mV, until the battery is fully charged. Therefore, by using the battery charging method provided in this application, the voltage of the normal electrochemical cell can be effectively controlled, to prevent the normal electrochemical cell from being overcharged.

Corresponding to the battery charging method in the foregoing embodiment, this application provides an electronic apparatus. The electronic apparatus may be an electronic device, a charging management module in the electronic device, or a charging management chip in the charging management module.

When the electronic apparatus is the charging management chip, the charging management chip includes a processor. The processor is coupled to a memory, and the processor executes a computer program or instructions stored in the memory, to implement the battery charging method in the foregoing embodiment. The memory may be disposed in the charging management chip, or may be located in another chip.

For example, the processor in the charging management chip may be the controller 11 or the controller 103 in FIG. 1.

The processor may include at least one of the following types: a central processing unit (Central Processing Unit, CPU), or the processor may be another general-purpose processor, a digital signal processor (Digital Signal Processor, DSP), or an application-specific integrated circuit (Application Specific Integrated Circuit, ASIC), a field-programmable gate array (Field-Programmable Gate Array, FPGA) or another programmable logic device, a discrete gate or transistor logic device, a discrete hardware component, or the like. The general-purpose processor may be a microprocessor, or the processor may be any conventional processor or the like.

A memory may be further disposed in the processor, and is configured to store instructions and data. In some embodiments, the memory in the processor is a cache. The memory may store instructions or data just used or cyclically used by the processor. If the processor needs to use the instructions or the data again, the processor may directly invoke the instructions or the data from the memory. This avoids repeated access and reduces waiting time of the processor, thereby improving system efficiency.

The memory may be configured to store a software program and a module. The processor runs the software program and the module stored in the memory, to perform various functions and applications of the electronic device and perform data processing. The memory may mainly include a program storage area and a data storage area. The program storage area may store a program required by at least one function (for example, a program of the charging method provided in this application), and the like. The data storage area may store data (such as a limited charging voltage, a maximum allowable charging voltage, and a derating rule) created based on use of the electronic device, and the like. In addition, the memory may include a high-speed random access memory, and may further include a nonvolatile memory, for example, at least one disk storage device, a flash memory device, or another volatile solid-state storage device.

Optionally, when the electronic apparatus is the charging management module, the charging management module includes a charging management chip, a battery formed by n electrochemical cells, and a charging circuit. A processor in the charging management chip is connected to the battery and the charging circuit. The processor is coupled to a memory. The processor executes a computer program or instructions stored in the memory, to implement the battery charging method in the foregoing embodiment.

For example, the charging management module may be the charging management module shown in FIG. 1. The charging management chip may be the controller 11 or the controller 103 in FIG. 1. The charging circuit may be the charging circuit 12 in FIG. 1. The battery may be the battery 10 in FIG. 1 or the n electrochemical cells in FIG. 1.

Figure 7:
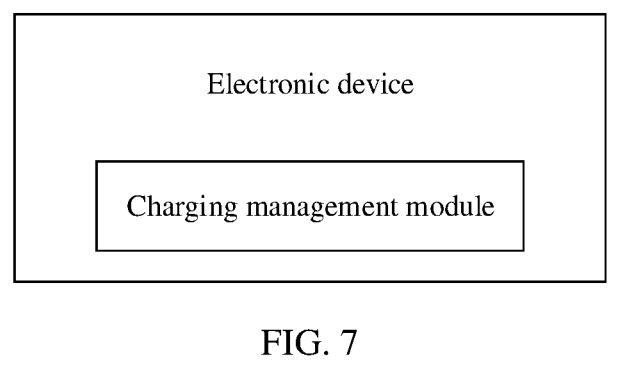

Optionally, when the electronic apparatus is the electronic device, as shown in FIG. 7, the electronic device includes a charging management module, and the charging management module includes a charging management chip, a battery formed by n electrochemical cells, and a charging circuit. A processor in the charging management chip is connected to the battery and the charging circuit. The processor is coupled to a memory. The processor executes a computer program or instructions stored in the memory, to implement the battery charging method in the foregoing embodiment.

In addition, although not shown, a communications module, a display module, a memory, an audio circuit, a sensor module, and the like of the electronic device are not described herein again.

An embodiment of this application further provides a nonvolatile computer-readable storage medium. The methods described in the foregoing embodiments may be all or partially implemented by software, hardware, firmware, or any combination thereof. If the methods are implemented in the software, functions may be used as one or more instructions or code and stored in the computer-readable medium or transmitted on the computer-readable medium. The computer-readable medium may include a computer storage medium and a communications medium, and may further include any medium that can transfer a computer program from one place to another. The storage medium may be any available medium accessible to a computer.

In an optional design, the computer-readable medium may include a read-only memory (read-only memory, ROM) or another type of static storage device that can store static information and instructions, a random access memory (random access memory, RAM) or another type of dynamic storage device that can store information and instructions, or may be an electrically erasable programmable read-only memory (electrically erasable programmable-only memory, EEPROM) or another optical disk memory, a magnetic disk memory or another magnetic storage device, or any other medium that may be used to carry, or stores required program code in a form of an instruction or a data structure, and may be accessed by a computer. In addition, any connection is appropriately referred to as a computer-readable medium. For example, if a coaxial cable, an optical fiber cable, a twisted pair, a digital subscriber line (DSL), or wireless technologies (such as infrared, radio, and micro-wave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combinations should also be included within the scope of the computer-readable medium.

An embodiment of this application further provides a computer program product. The methods described in the foregoing embodiments may be all or partially implemented by software, hardware, firmware, or any combination thereof. If the methods are implemented in the software, the methods may be all or partially implemented in a form of the computer program product. The computer program product includes one or more computer instructions. When the foregoing computer program instructions are loaded and executed on a computer, the procedures or functions described in the foregoing method embodiments are all or partially generated. The computer may be a general-purpose computer, a special-purpose computer, a computer network, a network device, user equipment, or another programmable apparatus.

In the foregoing embodiments, the descriptions of all embodiments have respective focuses. For a part that is not described or recorded in detail in an embodiment, refer to related descriptions in other embodiments.

The foregoing embodiments are merely intended to describe the technical solutions of this application, but are not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application, and these modifications and replacements shall fall within the protection scope of this application.

What is claimed is:

1. A method, applied to a battery formed by n electrochemical cells, wherein n is an integer greater than 1, and the method comprises:

obtaining a current charging current and voltages of the n electrochemical cells;

determining a derating current when a difference between a highest voltage in the voltages of the n electrochemical cells and a preset upper limit of a single electrochemical cell charging voltage is less than or equal to a preset difference, wherein the preset difference is greater than or equal to 0, the highest voltage is less than or equal to the preset upper limit of the single electrochemical cell charging voltage, and the derating current is less than the current charging current;

after determining the derating current, calculating a compensation voltage based on the derating current and impedance of a charge loop of the battery;

adding a limited charging voltage of the battery and the compensation voltage, to obtain a maximum allowable charging voltage of the battery;

setting a cut-off charging voltage to be the maximum allowable charging voltage of the battery; and indicating to charge the battery with the derating current.

2. The method of claim 1, wherein determining the derating current comprises:

determining the derating current based on an interval in which the current charging current is located, wherein the derating current corresponds to the interval.

3. The method of claim 1, wherein determining the derating current comprises:

determining the derating current from a preset current sequence.

4. The method of claim 1, further comprising:

when the current charging current is less than a preset first current value, the difference between the highest voltage and the preset upper limit of the single electrochemical cell charging voltage is less than or equal to the preset difference, and a sum of the voltages of the n electrochemical cells and a preset voltage adjustment value is less than the maximum allowable charging voltage of the battery, modifying the cut-off charging voltage to be the sum of the voltages of the n electrochemical cells and the preset voltage adjustment value.

5. The method of claim 4, wherein after setting the cut-off charging voltage to be the sum of the voltages of the n electrochemical cells and the preset voltage adjustment value, the method further comprises:

decreasing the cut-off charging voltage based on a voltage adjustment value when it is detected that the charging current is greater than a full-of-charge current of the battery.

6. The method of claim 4, wherein, the method further comprises:

increasing the cut-off charging voltage based on a voltage adjustment value when it is detected that the charging current is less than or equal to a preset second current value, and when a sum of the cut-off charging voltage and the voltage adjustment value is less than or equal to the maximum allowable charging voltage, wherein the second current value is less than a full-of-charge current of the battery.

7. An electronic apparatus, comprising:

a processor, wherein the processor is coupled to a memory, and when the processor executes a computer program or instructions stored in the memory, the following operations are implemented:

obtaining a current charging current and voltages of n electrochemical cells of a battery;

determining a derating current when a difference between a highest voltage in the voltages of the n electrochemical cells and a preset upper limit of a single electrochemical cell charging voltage is less than or equal to a preset difference, wherein the preset difference is greater than or equal to 0, the highest voltage is less than or equal to the preset upper limit of the single electrochemical cell charging voltage, and the derating current is less than the current charging current;

after determining the derating current, calculating a compensation voltage based on the derating current and impedance of a charge loop of the battery;

adding a limited charging voltage of the battery and the compensation voltage, to obtain a maximum allowable charging voltage of the battery;

setting a cut-off charging voltage to be the maximum allowable charging voltage of the battery; and indicating to charge the battery with the derating current.

8. The electronic apparatus of claim 7, wherein determining the derating current comprises:

determining the derating current based on an interval in which the current charging current is located, wherein the derating current corresponds to the interval.

9. The electronic apparatus of claim 7, wherein determining the derating current comprises:

determining the derating current from a preset current sequence.

10. The electronic apparatus of claim 7, wherein when the processor executes the computer program or instructions stored in the memory, the following further operations are implemented:

when the current charging current is less than a preset first current value, the difference between the highest voltage and the preset upper limit of the single electrochemical cell charging voltage is less than or equal to the preset difference, and a sum of the voltages of the n electrochemical cells and a preset voltage adjustment value is less than or equal to the maximum allowable charging voltage of the battery, setting the cut-off charging voltage to be the sum of the voltages of the n electrochemical cells and the preset voltage adjustment value.

11. The electronic apparatus of claim 10, wherein when the processor executes the computer program or instructions stored in the memory, the following further operations are implemented:

after setting the cut-off charging voltage to be the sum of the voltages of the n electrochemical cells and the preset voltage adjustment value, decreasing the cut-off charging voltage based on the voltage adjustment value when it is detected that the charging current is greater than a full-of-charge current of the battery.

12. The electronic apparatus of claim 11, wherein when the processor executes the computer program or instructions stored in the memory, the following further operations are implemented:

after the setting the cut-off charging voltage to be the sum of the voltages of the n electrochemical cells and the preset voltage adjustment value, increasing the cut-off charging voltage based on the voltage adjustment value when it is detected that the charging current is less than or equal to a preset second current value and a sum of the cut-off charging voltage and the voltage adjustment value is less than or equal to the maximum allowable charging voltage, wherein the second current value is less than the full-of-charge current of the battery.

13. The electronic apparatus of claim 11, wherein the electronic apparatus further comprises a charging circuit and the battery formed by the n electrochemical cells, and the processor is connected to the battery and the charging circuit, and wherein n is an integer greater than 1.

14. A non-transitory computer-readable storage medium, wherein the computer-readable storage medium stores a computer program, and when the computer program is executed by a processor, the following operations are implemented:

obtaining a current charging current and voltages of n electrochemical cells of a battery;

determining a derating current when a difference between a highest voltage in the voltages of the n electrochemical cells and a preset upper limit of a single electrochemical cell charging voltage is less than or equal to a preset difference, wherein the preset difference is greater than or equal to 0, the highest voltage is less than or equal to the preset upper limit of the single electrochemical cell charging voltage, and the derating current is less than the current charging current;

after determining the derating current, calculating a compensation voltage based on the derating current and impedance of a charge loop of the battery;

adding a limited charging voltage of the battery and the compensation voltage, to obtain a maximum allowable charging voltage of the battery;

setting a cut-off charging voltage to be the maximum allowable charging voltage; and indicating to charge the battery with the derating current.

15. The non-transitory computer-readable storage medium of claim 14, wherein determining the derating current comprises:

determining the derating current based on an interval in which the current charging current is located, wherein the derating current corresponds to the interval.

16. The non-transitory computer-readable storage medium of claim 14, wherein determining the derating current comprises:

determining the derating current from a preset current sequence.

17. The non-transitory computer-readable storage medium of claim 14, wherein when the computer program is executed by a processor, the following further operations are implemented:

when the current charging current is less than a preset first current value, the difference between the highest voltage and the preset upper limit of the single electrochemical cell charging voltage is less than or equal to the preset difference, and when a sum of the voltages of the n electrochemical cells and a preset voltage adjustment value is less than or equal to the maximum allowable charging voltage of the battery, setting the cut-off charging voltage to be the sum of the voltages of the n electrochemical cells and the preset voltage adjustment value.

\* \* \* \* \*